(12) United States Patent
Yoshioka et al.

(10) Patent No.: US 9,028,996 B2
(45) Date of Patent: May 12, 2015

(54) BATTERY PACK

(71) Applicant: Lithium Energy Japan, Kyoto-shi (JP)

(72) Inventors: Toshiki Yoshioka, Shiga (JP); Toshiki Kusunoki, Shiga (JP); Yoshihiro Masuda, Shiga (JP)

(73) Assignee: Lithium Energy Japan, Kyoto-shi, Kyoto (JP)

( * ) Notice: Subject to any disclaimer, the term of this patent is extended or adjusted under 35 U.S.C. 154(b) by 20 days.

(21) Appl. No.: 13/627,934

(22) Filed: Sep. 26, 2012

(65) Prior Publication Data

US 2013/0095359 A1    Apr. 18, 2013

(30) Foreign Application Priority Data

Sep. 29, 2011 (JP) ................................ 2011-214403
Sep. 26, 2012 (JP) ................................ 2012-213023

(51) Int. Cl.

| | | |
|---|---|---|
| *H01M 2/10* | (2006.01) | |
| *H01M 10/613* | (2014.01) | |
| *H01M 10/647* | (2014.01) | |
| *H01M 10/655* | (2014.01) | |
| *H01M 10/6557* | (2014.01) | |
| *H01M 10/656* | (2014.01) | |

(52) U.S. Cl.
CPC .......... *H01M 2/1016* (2013.01); *H01M 2/1072* (2013.01); *H01M 10/5004* (2013.01); *H01M 10/5032* (2013.01); *H01M 10/5044* (2013.01); *H01M 10/5059* (2013.01); *H01M 10/5061* (2013.01)

(58) Field of Classification Search
USPC .......................................................... 429/99
See application file for complete search history.

(56) References Cited

U.S. PATENT DOCUMENTS

| | | | | |
|---|---|---|---|---|
| 5,985,480 A | * | 11/1999 | Sato et al. ........................ 429/65 |
| 2006/0234119 A1 | * | 10/2006 | Kruger et al. ................. 429/160 |
| 2010/0047686 A1 | * | 2/2010 | Tsuchiya et al. .............. 429/178 |
| 2010/0215998 A1 | * | 8/2010 | Byun et al. ...................... 429/82 |
| 2010/0297486 A1 | | 11/2010 | Fujii |
| 2010/0304203 A1 | | 12/2010 | Buck et al. |
| 2011/0097614 A1 | * | 4/2011 | Kim .............................. 429/53 |
| 2011/0206948 A1 | * | 8/2011 | Asai et al. ......................... 429/7 |

FOREIGN PATENT DOCUMENTS

| | | |
|---|---|---|
| DE | 10 2008 059 949 A1 | 6/2010 |
| JP | 2005-302501 A | 10/2005 |
| JP | 2010-114025 A | 5/2010 |
| JP | 2010-272251 A | 12/2010 |
| JP | 2011-076967 A | 4/2011 |

OTHER PUBLICATIONS

Extended European Search Report dated Jan. 24, 2013.

* cited by examiner

*Primary Examiner* — Patrick Ryan
*Assistant Examiner* — Haixia Zhang
(74) *Attorney, Agent, or Firm* — McGinn IP Law Group, PLLC

(57) ABSTRACT

A battery pack includes a stack case, spacers, and inner cover members as insulating members. The stack case accommodates a plurality of single cells arranged in line. Each of the spacers is disposed between adjacent single cells. The inner cover member is provided for each of the single cells, and is disposed on a surface of the single cell where terminals are provided. The inner cover member includes a base portion opposed to a surface of the single cell between terminals and terminal insulating portions provided on both ends of the base portion and covering the terminals. The inner cover member is attached to the spacer.

18 Claims, 14 Drawing Sheets

BATTERY PACK

This application claims priority from Japanese Patent Applications Nos. 2011-214403 and 2012-213023, the disclosures of which are incorporated herein by reference in their entireties.

BACKGROUND OF THE INVENTION

The present invention relates to a battery pack having a plurality of single cells combined together, more particularly, to a structure of an insulating member arranged between terminals of adjacent single cells.

DESCRIPTION OF RELATED ART

A battery pack having a plurality of single cells combined together as disclosed in JP 2010-272251 A and JP 2011-76967 A requires insulating members for preventing short circuit between the single cell and a metal case for accommodating the battery pack, as well as short circuit between the single cells.

The battery pack includes a large number of single cells, but the number of single cells is changed depending on the intended use. In such battery pack, newly designing and producing the insulating member every time when the number of single cells is changed causes complexity of design operation, necessity for new mold, and necessity for changes in assembling operation, as well as necessity for inventories of a large number of parts.

SUMMARY OF THE INVENTION

It is an object of the present invention to easily prepare insulating members even if the number of single cells is changed, and to provide a battery pack that the single cells can be packed together with insulating members.

The present invention provides a battery pack comprising, a plurality of single cells, a case which accommodates the plurality of single cells arranged in line, and insulating members each provided for each of the single cells, the insulating members being disposed on a surface of the single cells where terminals are provided. Preferably, each of the insulating members includes a terminal insulating portion for covering the terminal of the single cell. Further, it is preferable that the battery pack comprises spacers disposed between the adjacent single cells. Furthermore, it is preferable that the insulating members are attached to the spacer.

Preferably, the spacer includes an insulating wall disposed between the terminals of the adjacent single cells not connected with each other, and wherein the insulating member is attached to the insulating wall. This arrangement achieves that insulation properties between the terminals of the adjacent single cells can be effectively secured by the cover member and the insulating wall of the spacer.

According to one aspect, the insulating wall is provided with a pair of engaging holes. An engaging projection is provided on the insulating members for one of the single cells opposed to each other across the insulating wall, the engaging projection being engaged with the one of the pair of engaging holes. Another engaging projection is provided on the insulating members for the other of the single cells opposed to each other across the insulating wall, the engaging projection being engaged with the other of the pair of engaging holes. This arrangement achieves that the cover member covering each of the single cells can easily be mounted on the insulating wall of the spacer. Further, it is possible to avoid erroneous assembly of the adjacent cover members.

It is preferable that a notch is provided in the terminal insulating portion of the insulating member, the notch facing a bus bar through which the terminals of the adjacent single cells are connected. Using the space of the notch, it is possible to pull out a wire connected to the terminal or the bus bar.

Preferably, the insulating member includes an engaging portion through which the adjacent insulating members are engaged with each other. This According to this configuration, it is possible to sequentially assemble the insulating members such that they do not separate from each other.

The insulating member may include projection inserted between the single cell and the case. The projection can more reliably hold a position of the single cell in the case.

An outer cover for covering the insulating member may be provided.

The insulating member may include a fixing portion for fixing a harness connected to the terminal of each of the single cells.

The insulating member may include a base portion which is opposed to the surface between the terminals of the single cell and at both ends of which the terminal insulating portions are provided.

According to the present invention, the insulating member is disposed on a surface of each of the single cell where the terminals are provided, and the insulating member is provided for each of the single cells. Therefore, even if the number of single cells used for a battery pack is changed, it is only necessary to adjust the number of lid members in accordance with the number of single cells, and it is unnecessary to newly produce an exclusive insulating member.

DETAILED DESCRIPTION OF THE INVENTION

Figure 1:
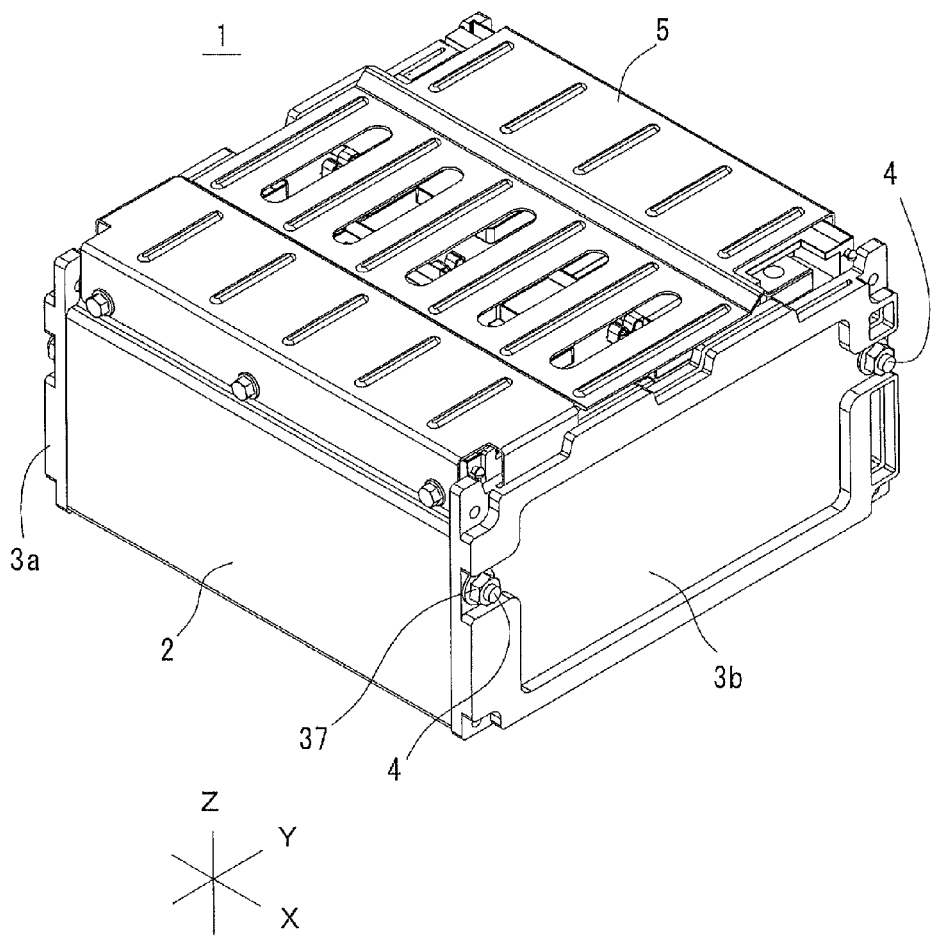
FIG. 1 is a perspective view of a battery pack according to the present invention.

An embodiment of the present invention will be described below with reference to the accompanying drawings. Herein, for convenience sake of description, X and Y axes which intersect with each other at right angles on a horizontal plane and a Z axis which intersects with the X and Y axes at right angles are set as shown in FIG. 1. Directions which are parallel to the X, Y, and Z axes are respectively referred to as an X direction, a Y direction, and a Z direction, respectively.

Figure 2:
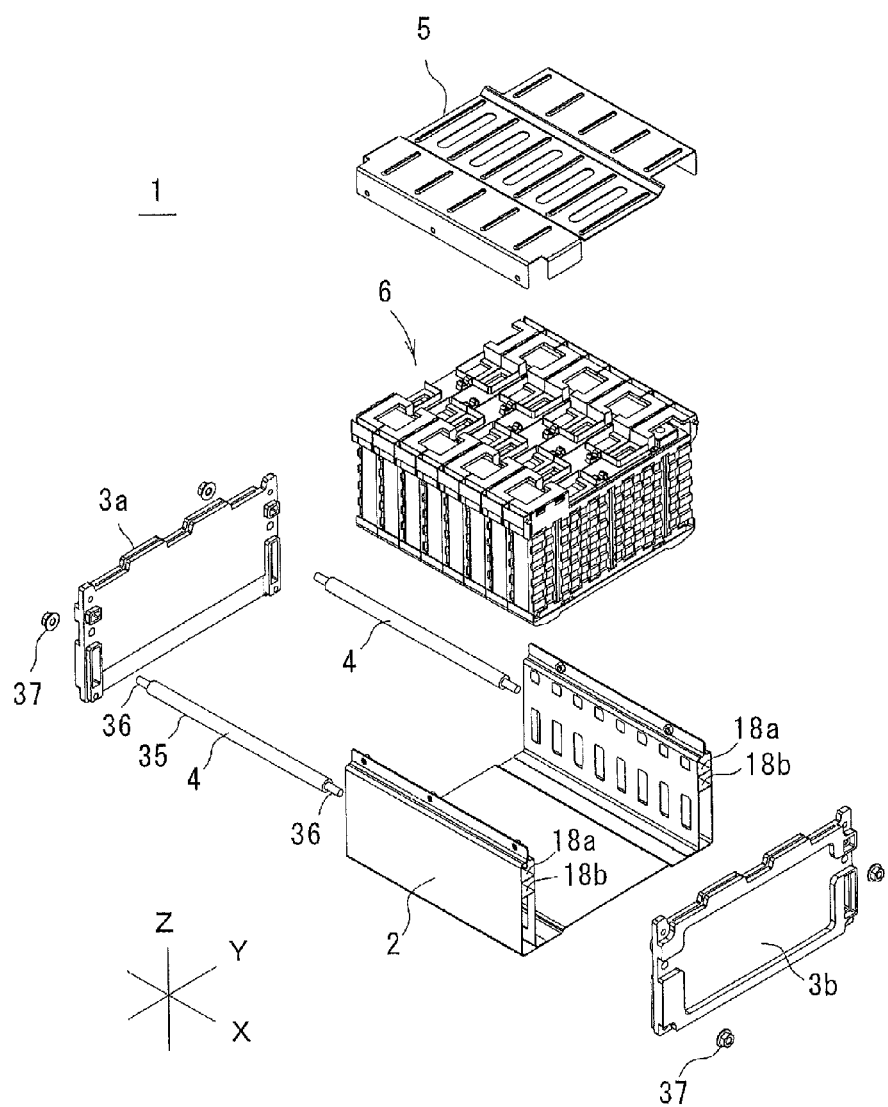
FIG. 2 is an exploded perspective view of the battery pack shown in FIG. 1.

FIG. 1 shows a battery pack 1 according to the embodiment of the present invention. As shown in FIG. 2, the battery pack 1 mainly includes a stack case 2, end plates 3a and 3b, assembling shafts 4, a stack outer cover 5, and a battery pack assembly 6.

Figure 4:
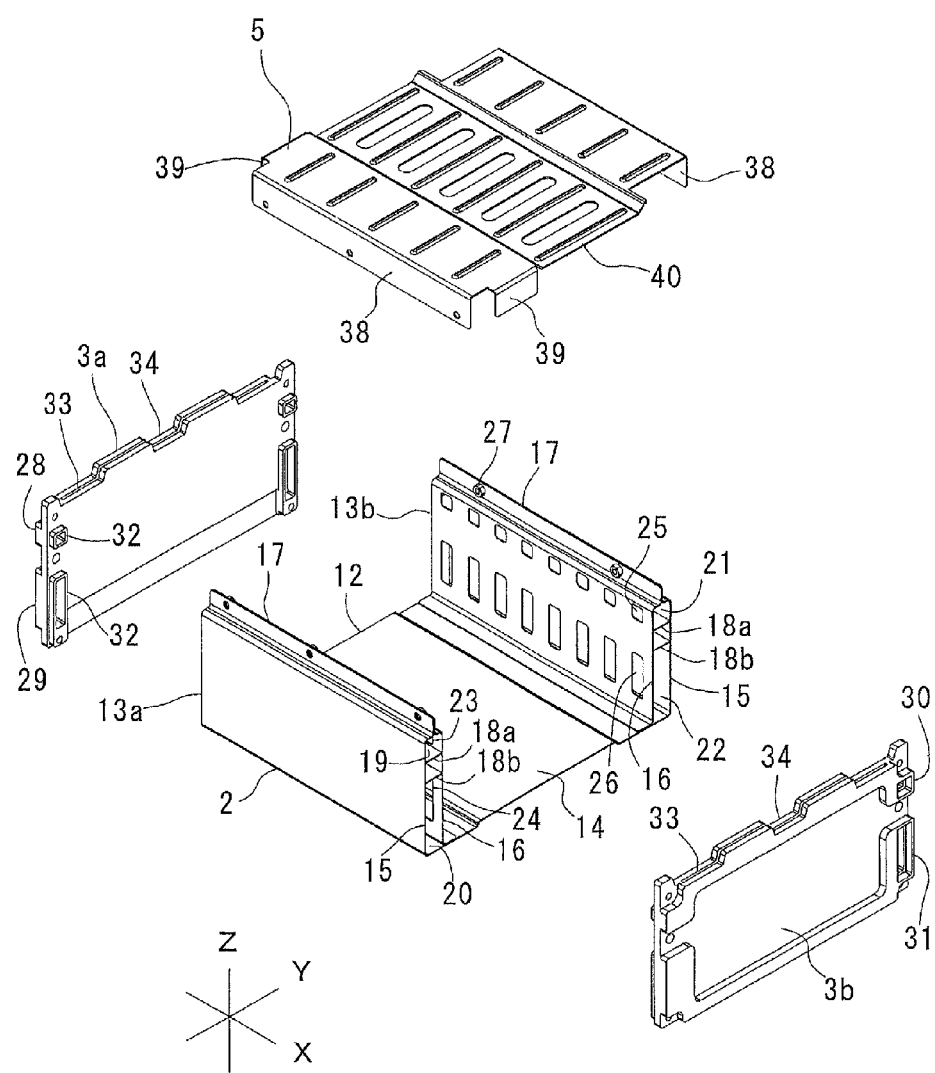
FIG. 4 is a perspective view of a stack case, end plates, and a stack outer cover.

As shown in FIG. 4, the stack case 2 is formed from steel plate. The stack case 2 includes a rectangular bottom plate 12 extending in the X and Y directions, and a left wall portion 13a and a right wall portion 13b formed upright, in the Z direction, from both ends of the bottom plate 12 in the Y direction. In the stack case 2, both ends in the X direction and upper ends in the Z direction are opened.

A central portion of the bottom plate 12 has a projection 14 which is formed slightly higher than the both ends of the Y direction. The projection 14 reinforces the bottom plate 12. A recess 54 of a later-described bottom member 9 is engaged with the projection 14 such that the recess 54 can move in the X direction.

Each of the left wall portion 13a and the right wall portion 13b is formed from an outer wall 15 and an inner wall 16. Lower ends of the outer walls 15 are integrally formed on the bottom plate 12 such that the lower ends are continuous with the both ends of the bottom plate 12 of the Y direction. Lower ends of the inner walls 16 are connected to the bottom plate 12. Upper ends 17 of the outer walls 15 and the inner walls 16 are bent into L-shapes in mutually approaching directions and connected to each other.

Two ribs 18a and 18b extending in the X direction are provided between the outer wall 15 and the inner wall 16 of the left wall portion 13a. Both side ends of the ribs 18a and 18b in the Y direction are connected to the outer wall 15 and the inner wall 16. A first refrigerant passage 19 is formed in a space between the outer wall 15 and the inner wall 16 located above the upper rib 18a. A second refrigerant passage 20 is formed in a space between the outer wall 15 and the inner wall 16 located below the lower rib 18b. A cross section of the first refrigerant passage 19 which is orthogonal to the X direction is formed smaller than a cross section of the second refrigerant passage 20 which is orthogonal to the X direction. Sizes of the first refrigerant passage 19 and the second refrigerant passage 20 may be determined such that more refrigerant flows through portions of the single cells 7 where surface temperature is high, and the sizes are not limited to the shape of the embodiment.

Similarly, a third refrigerant passage 21 and a fourth refrigerant passage 22 are formed in the right wall portion 13b by means of ribs 18a and 18b.

A plurality of first openings 23 which are in communication with the first refrigerant passage 19 are formed in the inner wall 16 of the left wall portion 13a at constant distances from one another in the X direction. The distances are equal to arrangement intervals of later-described spacers 8. Similarly, a plurality of second openings 24 which are in communication with the second refrigerant passage 20 are formed at constant distances from one another in the X direction. The distances are equal to those of the first openings 23. Widths of the first openings 23 and the second openings 24 in the X direction are the same, but lengths thereof in the Z direction are different from each other, and the lengths of the first openings 23 are smaller than those of the second openings 24. Similarly to the first refrigerant passage 19 and the second refrigerant passage 20, sizes of areas of the first opening 23 and the second opening 24 may be determined such that more refrigerant flows through portions of the single cells 7 where surface temperature is high, and the sizes are not limited to the shape of this embodiment.

Third openings 25 and fourth openings 26 which are similar to the first openings 23 and the second openings 24 of the left wall portion 13a are also formed in the inner wall 16 of the right wall portion 13b.

Nuts 27 for fixing the stack outer cover 5 through screws are fixed to upper ends 17 of the wall portions 13a and 13b.

The end plates 3a and 3b are plate-like members for closing openings in both ends of the stack case 2 of the X direction. In FIG. 4, in one end of the left end plate 3a, there are formed a first refrigerant inlet 28 which is in communication with the first refrigerant passage 19 and a second refrigerant inlet 29 which is in communication with the second refrigerant passage 20 of the left wall portion 13a of the stack case 2. Similarly, in one end of the right end plate 3b, there are formed a first refrigerant outlet 30 which is in communication with the third refrigerant passage 21 and a second refrigerant outlet 31 which is in communication with the fourth refrigerant passage 22 of the right wall portion 13b of the stack case 2. Projections 32 projecting toward the stack case 2 are provided on edges of the first and second refrigerant inlets 28 and 29 and the first and second refrigerant outlets 30 and 31, and these edges face the stack case 2. The projections 32 are inserted into the first and second refrigerant passages 19 and 20 and the third and fourth refrigerant passages 21 and 22 so that cooling media do not leak out from gaps between the stack case 2 and the end plates 3a and 3b. In upper end surfaces of the end plates 3a and 3b, there are formed slits 33 into which insertion pieces 39 of the later-described stack outer cover 5 are inserted. Further, in central portions of the upper end surfaces of the end plates 3a and 3b, notches 34 for pulling out harnesses are formed.

As shown in FIG. 2, the assembling shafts 4 are round rods inserted between the two ribs 18a and 18b of the stack case 2. Each of the assembling shafts 4 includes a central large-diameter portion 35 and small-diameter portions 36 on both ends. Threads on which nuts 37 are mounted are formed in the small-diameter portions 36 on both ends of the shaft 4. A length of the central large-diameter portion 35 of the shaft 4 is formed longer than a length of the stack case 2 in the X direction so that even if the nuts 37 are fastened to the small-diameter portions 36 on both ends of the shaft 4 through the end plates 3a and 3b, the stack case 2 is not crushed.

Referring back to FIG. 4, the stack outer cover 5 is formed from metal plate, more specifically, from steel plate made of conductive material. Mounting pieces 38 which are screwed to the upper ends 17 of the stack case 2 are formed on both ends of the stack outer cover 5 in the Y direction by bending the both ends toward the stack case 2 in the Z direction. Insertion pieces 39 inserted into the slits 33 of the end plates 3a and 3b are formed on both ends of the stack outer cover 5 in the X direction by bending the both ends toward the end plates 3a and 3b in the Z direction. The stack outer cover 5 has a convex portion 40 formed at a central portion of an inner surface thereof. The convex portion 40 is formed slightly lower than the both ends of the stack outer cover 5 in the Y direction. The convex portion 40 reinforces the stack outer cover 5, and engages with a below-described recess 71 of an inner cover member 11 to hold the inner cover member 11.

In this embodiment, an outer cover 5 is mounted on the stack case 2. However, if an upper portion of the battery pack assembly 6 is closed with a floor or a seat of a vehicle for example, the outer cover 5 can be replaced by the floor or the seat. In other words, a member like the outer cover 5 of this embodiment is not necessarily required as long as the single cells 7 accommodated in the stack case 2 can be protected by the later-described inner cover member 11.

Figure 3:
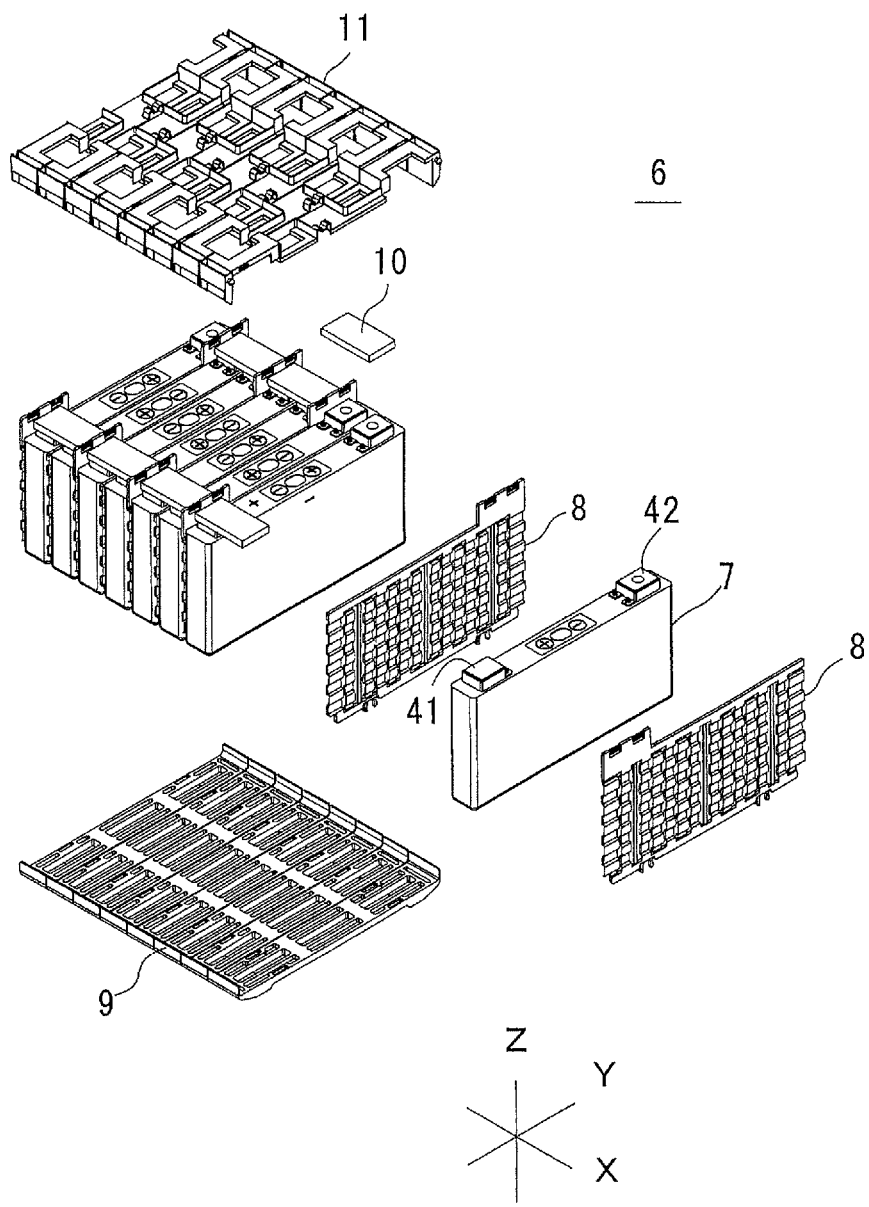
FIG. 3 is an exploded perspective view of a battery pack assembly.

In FIG. 3, the battery pack assembly 6 includes a plurality of single cells 7, the spacers 8 (the number of which is greater than that of the battery packs 7 by one), bottom members 9 (the number of which is the same as that of the battery packs 7), bus bars 10 (the number of which is smaller than that of the battery packs 7 by one), and the inner cover members 11 (the number of which is the same as that of the battery packs 7). The inner cover member 11 is one example of the insulating member of the invention of the present application. The inner cover member 11 is located between the outer cover 5 which covers an upper opening of the stack case 2 and surfaces of the single cell 7 where terminals 41 and 42 are provided.

In this embodiment, each of the single cells 7 is a non-aqueous secondary battery such as a lithium-ion battery. The single cell 7 has a width in the X direction capable of being accommodated between the left wall portion 13a and the right wall portion 13b of the stack case 2, a depth in the Y direction, and a height in the Z direction. The single cell 7 has, on its upper surface, positive and negative electrodes 41 and 42. The single cell 7 may literally be a single battery, or may include a unit of a plurality of small batteries arranged in the X direction.

Figure 5A:
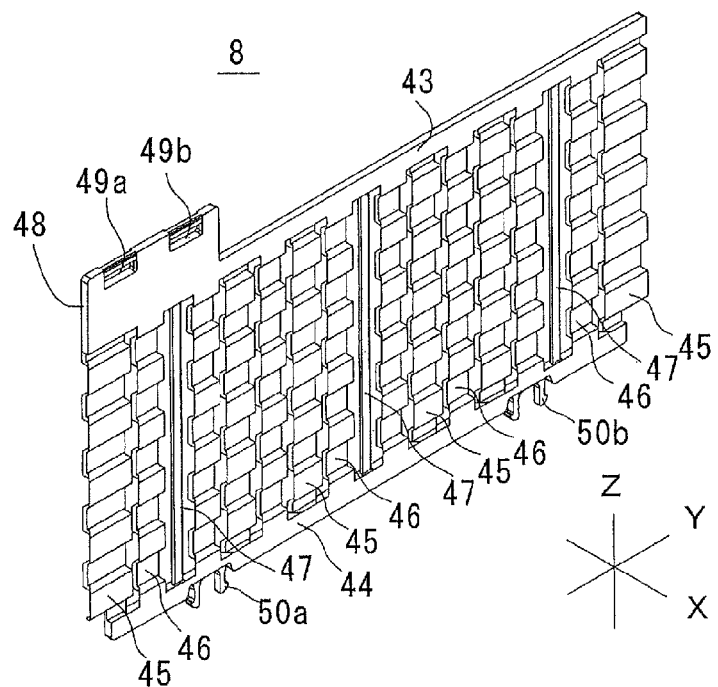
FIG. 5A is a perspective view of a spacer.
Figure 5B:
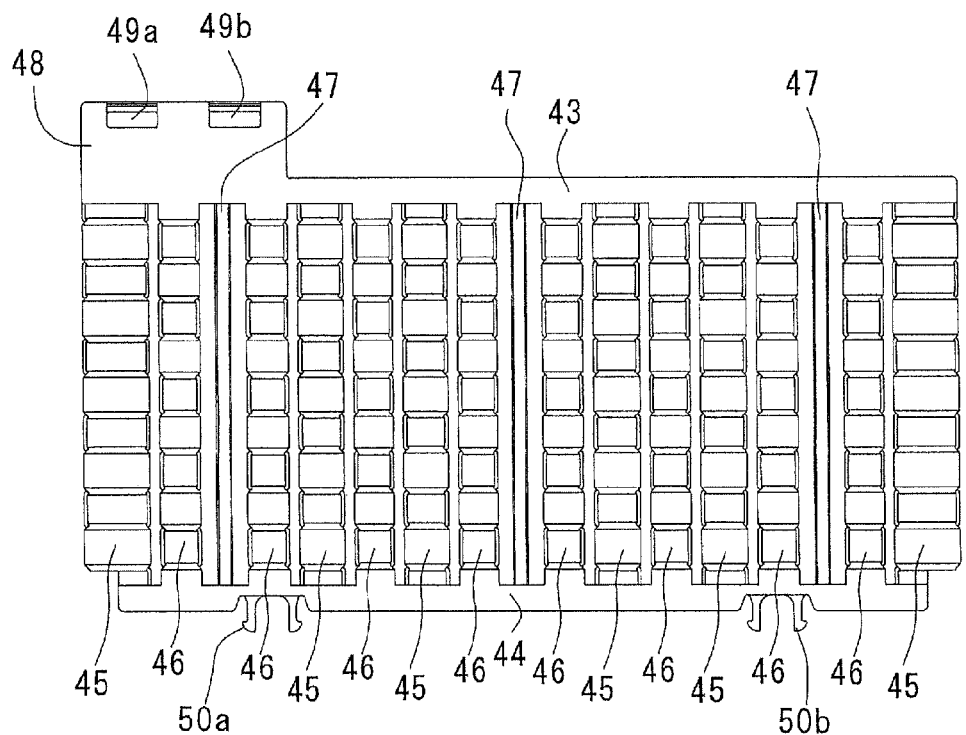
FIG. 5B is a front view of the spacer.

As shown in FIGS. 5A and 5B, each of the spacers 8 is molded from synthetic resin. The spacer 8 includes an upper sash bar 43 and a lower sash bar 44 extending in the Y direction. First convexo-concave portions 45, second convexo-concave portions 46, and straight portions 47 are formed between the upper sash bar 43 and the lower sash bar 44.

In each of the first convexo-concave portions 45, concave portions and convex portions are alternately formed in a corrugated form in the Z direction on a first surface viewed from the X direction, and concave portions and convex portions are also alternately formed in a corrugated form in the Z direction on a second surface which is on a back side of the first surface. Similarly to the first convexo-concave portion 45, concave portions and convex portions are alternately formed in a corrugated form on the second convexo-concave portion 46, but the concave portions and convex portions are reversely formed from those of the first convexo-concave portion 45. The straight portions 47 connect the upper sash bar 43 and the lower sash bar 44 with each other, extend straightly in the Z direction, and prevent the spacers 8 from extending in the Z direction.

On an upper end of the upper sash bar 43 of each of the spacers 8 at a location close to one end of the upper end of the upper sash bar 43, an insulating wall 48 having a width in the Y direction which is greater than those of the terminals 41 and 42 of the single cell 7 is integrally formed so as to project upward. Since the insulating wall 48 is integrally formed on the spacer 8, it is unnecessary to separately provide the insulating wall 48 as a separate part, and the number of parts is reduced. Two engaging holes 49a and 49b are formed in each of the insulating walls 48 such that the engaging holes 49a and 49b are arranged in the Y direction. Engaging projections 65 of the later-described inner cover member 11 are engaged with the engaging holes 49a and 49b.

A pair of engaging pawls 50a and 50b are formed on both sides of a lower end of the lower sash bar 44 of the spacer 8. The engaging pawls 50a and 50b are formed by forming pawls on tip ends of resilient arms, and the engaging pawls 50a and 50b engage with engaging holes 53 of the later-described bottom member 9.

Figure 6A:
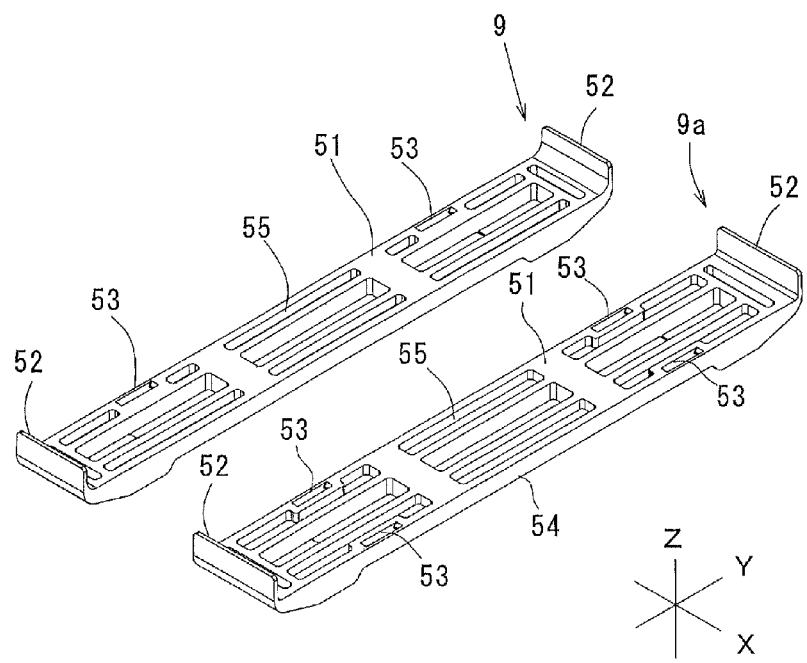
FIG. 6A is a perspective view of two kinds of bottom members.
Figure 6B:
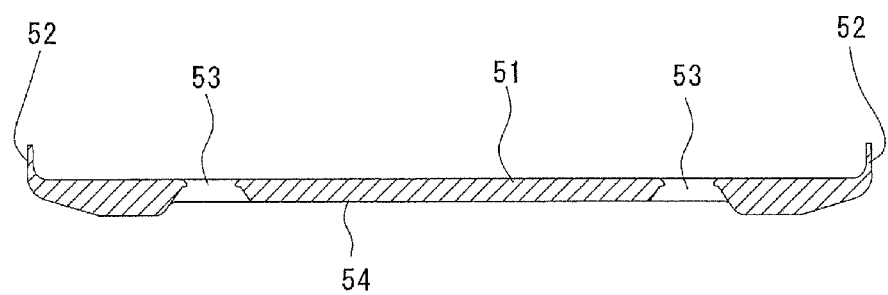
FIG. 6B is a sectional view of the two kinds of bottom members.

As shown in FIGS. 6A and 6B, the bottom member 9 is molded from synthetic resin. The bottom member 9 is provided corresponding to each of the single cells 7. The bottom member 9 includes a base portion 51 and projecting pieces 52. One single cell 7 is placed on an upper surface of the base portion 51. The projecting pieces 52 are formed upright in the Z direction, from both ends of the base portion 51 in the Y direction.

Engaging holes 53 into which the pair of engaging pawls 50a and 50b of the spacer 8 engage are formed in one side end of the base portion 51. The concave portion 54 with which the convex portion 14 of the stack case 2 engages is formed on the bottom surface of the base portion 51. Long holes 55 for reducing weight and for preventing shrinkage at the time of molding are extensively formed in the base portion 51. Each of the projecting pieces 52 is interposed in a gap between the single cell 7 and the left and right wall portions 13a and 13b of the stack case 2, and prevents the single cell 7 from moving in the Y direction.

Since engaging holes 53 are formed in both side ends of the base portion 51 such that the two spacers 8 are mounted, bottom members 9a located on both ends of the battery pack assembly 6 in the X direction are formed wider than other bottom members 9.

Referring back to FIG. 3, the bus bar 10 is made of a conductive plate-like material, and the bus bar 10 electrically connects the positive terminal 41 and the negative terminal 42 of the adjacent single cells 7.

Figure 7A:
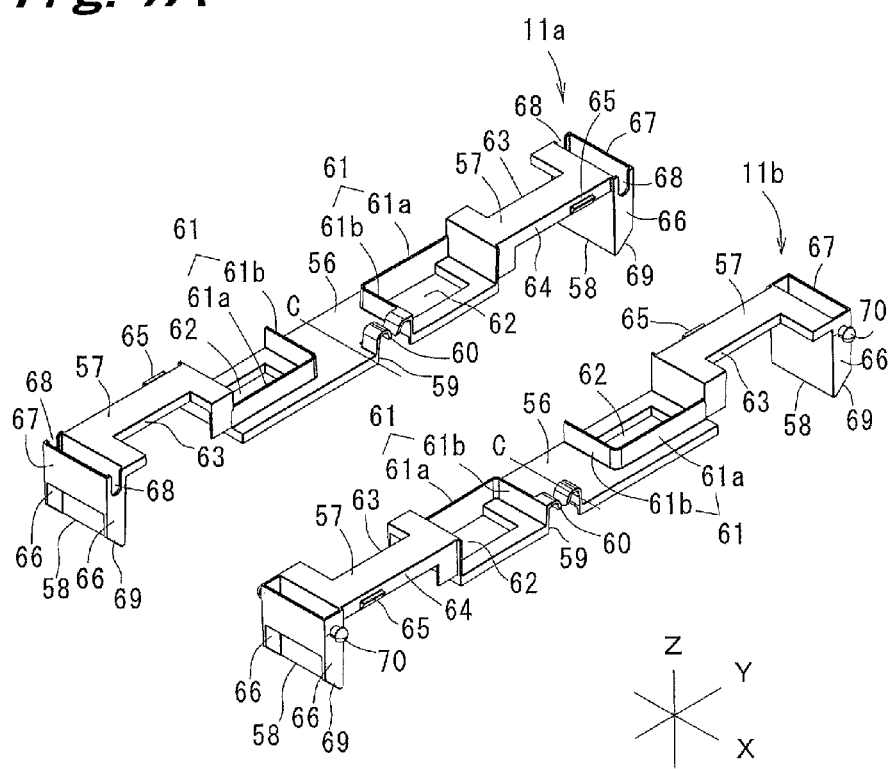
FIG. 7A is a perspective view of two kinds of inner cover members.
Figure 7B:
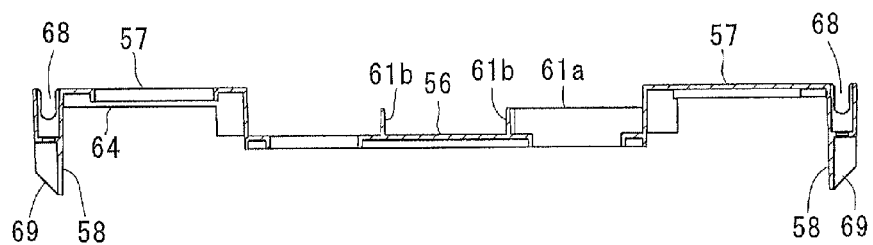
FIG. 7B is a sectional view of the inner cover member.

As shown in FIGS. 7A and 7B, the inner cover member 11 is molded from synthetic resin. The inner cover member 11 is provided corresponding to each of the single cells 7. The inner cover member 11 includes two kinds of members, i.e., a first inner cover member 11a and a second inner cover member 11b. The inner cover member 11 has substantially the same width as a size of the single cell 7 in its short side direction as viewed from a surface of the single cell 7 where the terminals 41 and 42 are provided, and has substantially the same length as a size of the single cell 7 in its long side direction. More specifically, the width of the inner cover member 11 is equal to a total of a thickness of the spacer 8 and a size of the single cell 7 in its short side direction as viewed from the surface of the single cell 7 where the terminals 41 and 42 are provided. The inner cover members 11 are disposed in the short side direction of the single cell with the same pitch as the single cells. A length of the inner cover member 11 is greater than a size of the single cell 7 in its long side direction by sizes of later-described projections 58 on both ends.

The first inner cover member 11a includes a central base portion 56, terminal insulating portions 57 formed higher than the base portion 56 on both sides of the base portion 56, and projections 58 projecting downward along the Z direction from ends of the terminal insulating portions 57. A width of the base portion 56 of the first inner cover member 11a is the same as a size of the single cell 7 in its short side direction as viewed from the surface of the single cell 7 where the terminals 41 and 42 are provided. A length of the base portion 56 between the left and right terminal insulating portions 57 and 57 of the first inner cover member 11a is the same as the size of the single cell 7 in its long side direction.

A notch 59 is formed in a central portion of an upper surface of the base portion 56 on one side end in the X direction, and a fixing portion 60 which is a pair of bending arms for fixing a harness is formed on an opposing edge of the notch 59. A guide portion 61 is formed on one end of the upper surface of the base portion 56. The guide portion 61 includes a first guide portion 61a extending in the Y direction from a position close to one side end toward a center, and a second guide portion 61b extending in the X direction from an end of the first guide portion 61a toward the other side end thereof. Similarly, a guide portion 61 is formed on the other end of the upper surface of the base portion 56. The guide portion 61 includes a first guide portion 61a extending in the Y direction from a position close to one side end toward a center, and a second guide portion 61b extending in the X direction from an end of the first guide portion 61a toward the other side end thereof. Openings 62 are formed in both ends of the base portion 56 for reducing weight, reducing material, and preventing molding failure.

A notch 63 is formed in one side edge of each of the terminal insulating portions 57. The notch 63 is formed at such a position that when the first inner cover member 11a is mounted on the single cell 7, the notch 63 is located above the terminals 41 and 42 of the single cell 7 and about halves of the terminals 41 and 42 are exposed. Providing the notch 63, as described later, after mounting the inner cover members 11 are mounted to the single cells 7, a wire for connection to a measurement instrument can be connected to the terminals 41, 42 or the bus bar 10 and can be drawn out from the inner cover member 11.

An engaging projection 65 is formed on a reinforcing rib 64 provided on the other side edge of the terminal insulating portion 57. The engaging projection 65 is opposed to the insulating wall 48 of the spacer 8 and the engaging projection 65 engages with one of the engaging holes 49a and 49b of the insulating wall 48.

The projection 58 is provided with reinforcing ribs 66 on both side edges in the X direction, and a reinforcing plate 67 which connects the reinforcing ribs 66 to each other to form into a box shape. An engaging groove 68 is formed in an upper end of each of the reinforcing ribs 66. Lower ends of both the reinforcing ribs 66 are formed into tapered portions 69 which are tapered downward.

The second inner cover member 11b is mirror-symmetrical to the first inner cover member 11a on an X-Y plane except for the fixing portion 60, the engaging projection 65, and the engaging groove 68. A fixing portion 60 of a base portion 56 of the second inner cover member 11b is formed on the same side edge as the fixing portion 60 of the first inner cover member 11a, but is formed on the opposite side with respect to a center line C in the X direction. An engaging projection 65 of a terminal insulating portion 57 of the second inner cover member 11b is formed on a side edge opposite to the engaging projection 65 of the terminal insulating portion 57 of the first inner cover member 11a, and is formed at a location far from the center line C in the X direction. An engaging projection 70 which engages with the engaging groove 68 of the first inner cover member 11a is formed on a projection 58 of the second inner cover member 11b.

Next, an assembling procedure of the battery pack 1 having the above configuration will be described.

Figure 8:
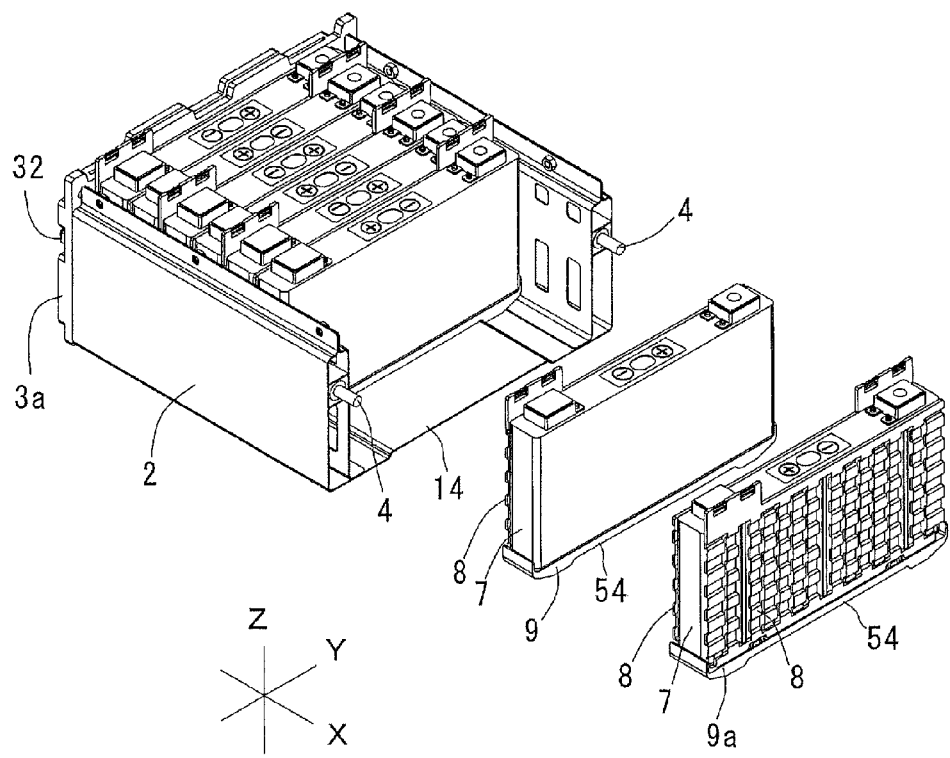
FIG. 8 is a perspective view showing a state where sets each including a bottom member, single cells, and spacers are accommodated in the stack case.

As shown in FIG. 8, the shafts 4 are inserted between the ribs 18a and 18b of the stack case 2, the nuts 32 are mounted on one ends of the shafts 4, the end plate 3a is placed on one end of the stack case 2, and the other end of the stack case 2 is left open. The end plate 3a may be mounted after the battery pack assembly 6 is accommodated.

Next, the engaging pawls 50a and 50b of the lower end of the spacer 8 are engaged with the engaging holes 53 of the bottom member 9 to integrally form the spacer 8 and the bottom member 9, and the single cell 7 is placed on the bottom member 9. One set of the spacer 8, the bottom member 9, and the single cell 7 is inserted from the opened end of the stack case 2, the concave portion 54 of the bottom member 9 is engaged with the convex portion 14 of the stack case 2, which is scover toward a depth side of the stack case 2 in the X direction, and it is accommodated in the stack case 2. Similarly, all of other sets of the spacers 8, the bottom members 9, and the single cells 7 are accommodated in the stack case 2. The spacers 8 are mounted on both ends of the last bottom member 9a, and the bottom member 9a is accommodated in the stack case 2 with the single cell 7 sandwiched between the two spacers 8 and 8. The spacers 8 are disposed such that the insulating walls 48 are alternately disposed on the left side and the right side as viewed from the X direction. According to this configuration, the insulating walls 48 of the spacers 8 are disposed in a zigzag form from one end single cell to the other end single cell of the battery pack, i.e., in the X direction as viewed from the terminal of the battery pack 1, i.e., from the Z direction.

When the insulating walls 48 of the spacers 8 are not disposed in the zigzag form due to erroneous assembly, if the insulating wall 48 of the erroneously disposed spacer 8 is pulled upward, the engaging pawls 50a and 50b of the spacer 8 are detached from the engaging holes 53 of the bottom member 9. Therefore, only the spacer 8 can be pulled out and disposed in the correct direction. Since the insulating wall 48 is integrally formed on the spacer 8, it is unnecessary to separately mount the insulating wall 48, a structure around the terminals 41 and 42 is simplified, and since only the spacer 8 needs to be mounted, it is easy to assemble.

After all of the spacers 8, the bottom members 9, 9a and the single cells 7 are accommodated in the stack case 2, the end plate 3b is placed on the opened end of the stack case 2, and the nuts 32 are mounted on and fastened to the shafts 4 which project from the endplate 3b. At this time, since the large-diameter portion 35 of the shaft 4 is longer than the length of the stack case 2, even if the nuts 32 are fastened, the length of the end plate 2 in the X direction does not become shorter than the length of the large-diameter portion 35 of the shaft 4, and the stack case 2 is not crushed.

Figure 9:
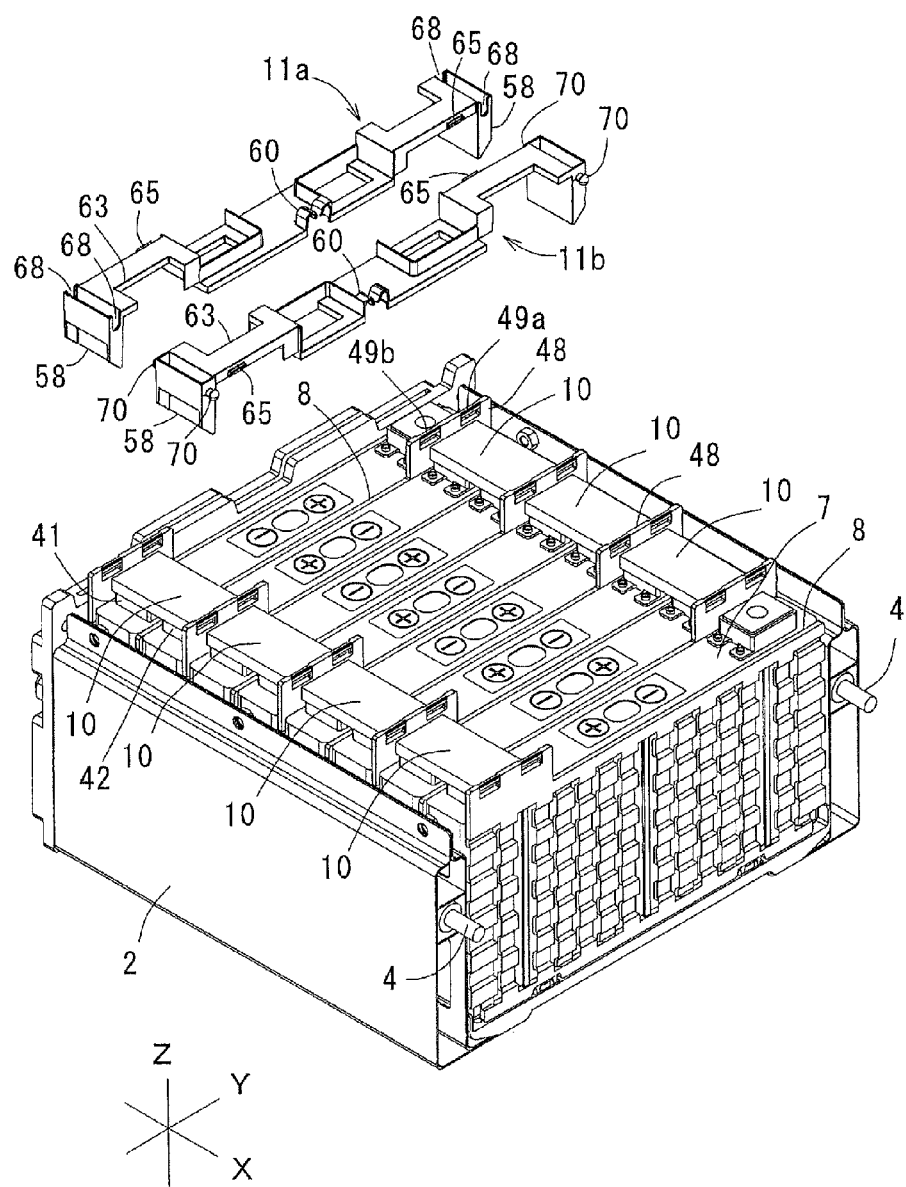
FIG. 9 is a perspective view showing a state where bus bars and the inner cover members are mounted on the single cells and the spacers accommodated in the stack case.

Next, as shown in FIG. 9, bus bars 10 are mounted on the electrodes 41 and 42 of the adjacent single cells 7, and all of the single cells 7 are connected to one another in series.

Next, the inner cover members 11a and 11b are mounted on the single cells 7. At this time, the first and second inner cover members 11a and 11b are alternately mounted. That is, there is employed such a design that the notch 63 and the notch 63 are opposed to each other to face the bus bar 10 on the side of one end where the adjacent two single cells 7 are connected to each other through the bus bar 10, and the engaging projection 65 and the engaging projection 65 are opposed to each other on the side of other end where the two single cells 7 are not connected through the bus bar 10. The engaging projection 70 of the second inner cover member 11b is engaged with the engaging groove 68 of the first inner cover member 11a so that the engaging groove 68 and the engaging projection 70 do not separate from each other.

When the inner cover members 11a and 11b are mounted on the single cells 7, the engaging projection 65 of the first inner cover member 11a is engaged with one of the adjacent engaging holes 49a of the spacer 8, and the engaging projection 65 of the second inner cover member 11b is engaged with the other of the adjacent engaging holes 49b of the spacer 8.

Figure 14:
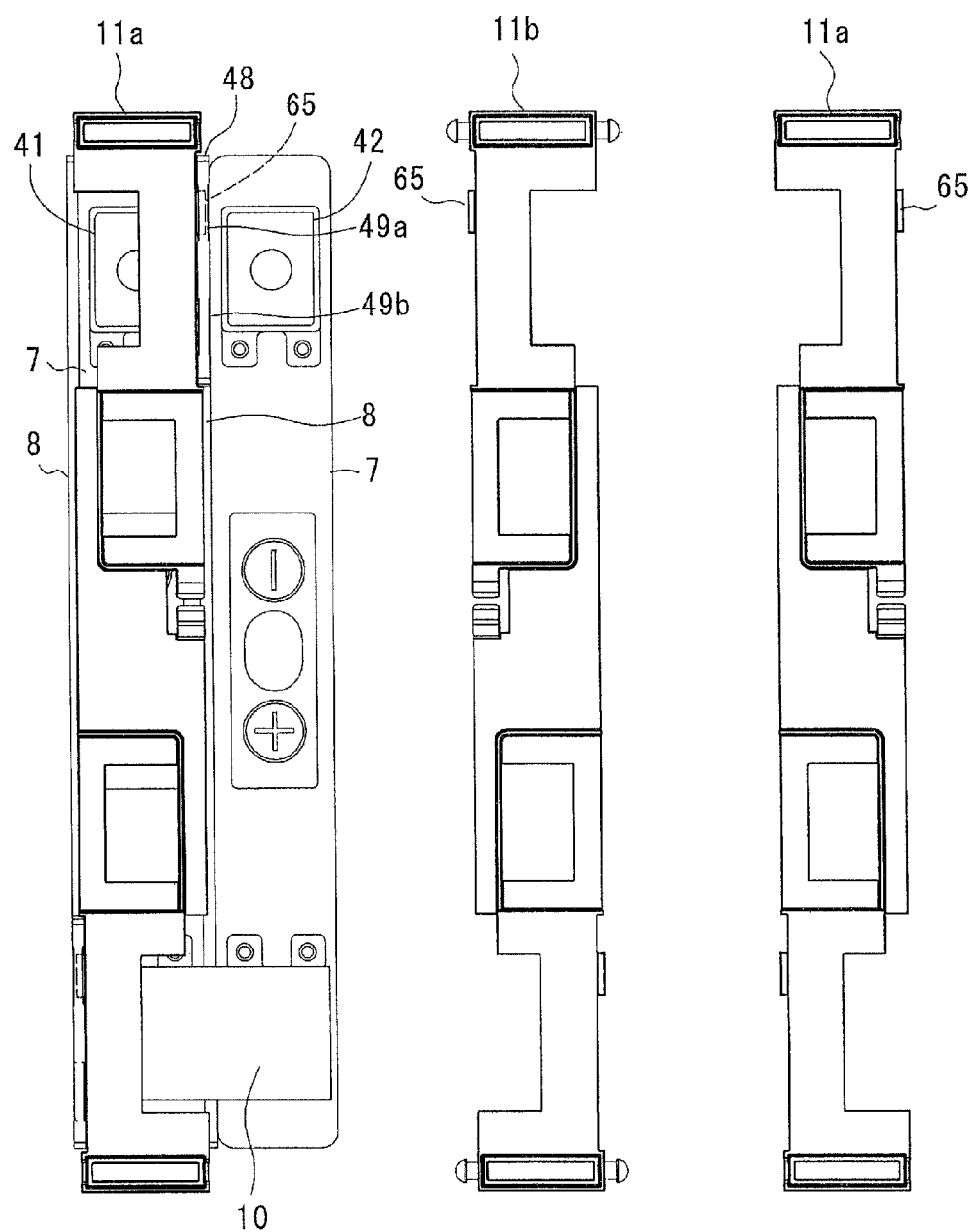
FIG. 14 is a plan view showing a state where first and second inner cover members are mounted.

By engaging the engaging projections 65 with the engaging holes 49a and 49b in this manner, the first and second inner cover members 11a and 11b are detachably mounted on the spacer 8. As shown in FIG. 14, even if an attempt is made to mount the second inner cover member 11b in a left-right reversal manner, since the engaging projection 65 of the first inner cover member 11a is already engaged with the engaging hole 49a with which the engaging projection 65 of the second inner cover member 11b is to be engaged, the second inner cover member 11b cannot be mounted. Further, even if an attempt is made to mount another first inner cover member 11a beside the first inner cover member 11a which is already mounted, since the engaging projection 65 which should be engaged with the engaging holes 49a and 49b of the insulating wall 48 is located on the opposite side, the first inner cover member 11a cannot be mounted. According to this configuration, erroneous assembly of the inner cover members 11a and 11b can be prevented.

Figure 13:
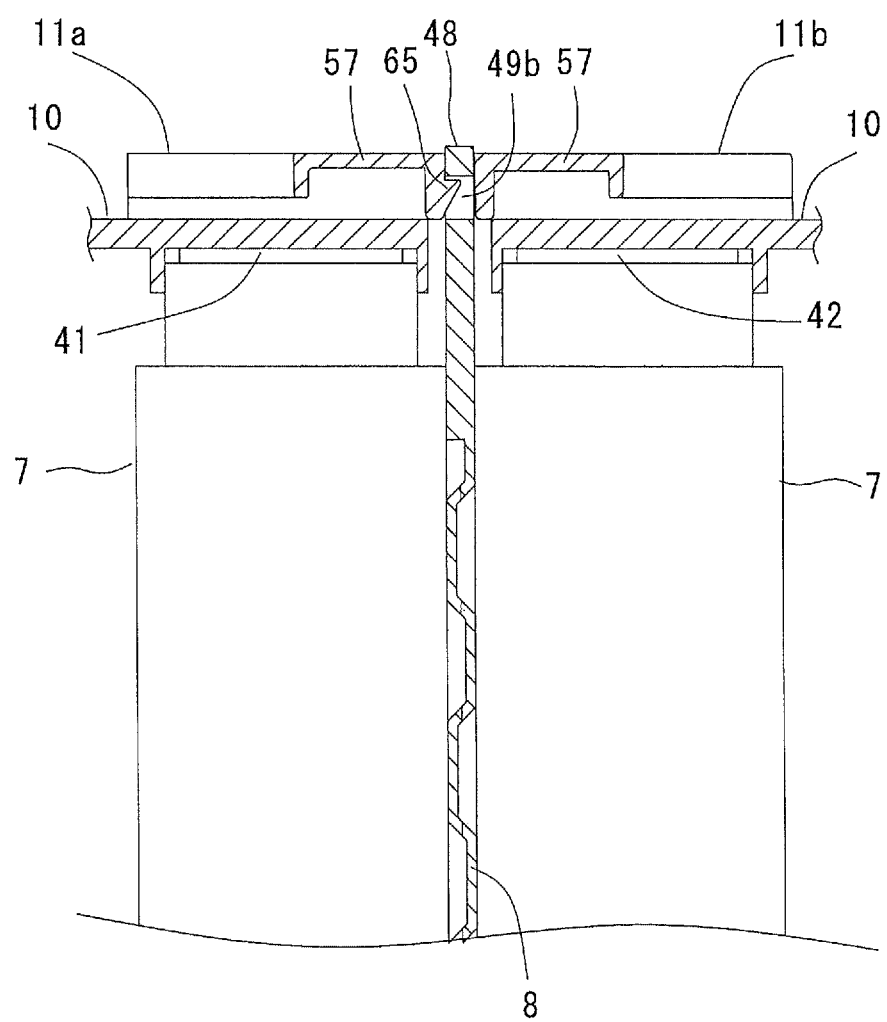
FIG. 13 is a sectional view showing an insulating structure around a terminal of the single cell.

FIG. 13 shows an insulating structure around the terminals 41 and 42 of the adjacent single cells 7. The insulating wall 48 of the spacer 8 is located between the terminals 41 and 42. By engaging the engaging projections 65 with the engaging holes 49a and 49b, the terminal insulating portions 57 of the first and second inner cover members 11a and 11b are mounted on the insulating wall 48. Hence, a long creeping distance from the terminal 41 of the left single cell 7 to the terminal 42 of the right single cell 7 in FIG. 13 is secured by the insulating wall 48 and the terminal insulating portion 57, and the terminals 41 and 42 of the adjacent single cells 7 are sufficiently electrically insulated from each other. Further, since the first and second inner cover members 11a and 11b are mounted on the spacer 8, positions of the inner cover members 11a and 11b and the spacer 8 with respect to the single cell are reliably held against vibration caused when the battery pack is mounted in a vehicle for example. As a result, it is possible to avoid a case where insulation properties of the first and second inner cover members 11a and 11b kept by the terminal insulating portions 57 are deteriorated due to displacement of the first and second inner cover members 11a and 11b with respect to the single cell 7.

Figure 10:
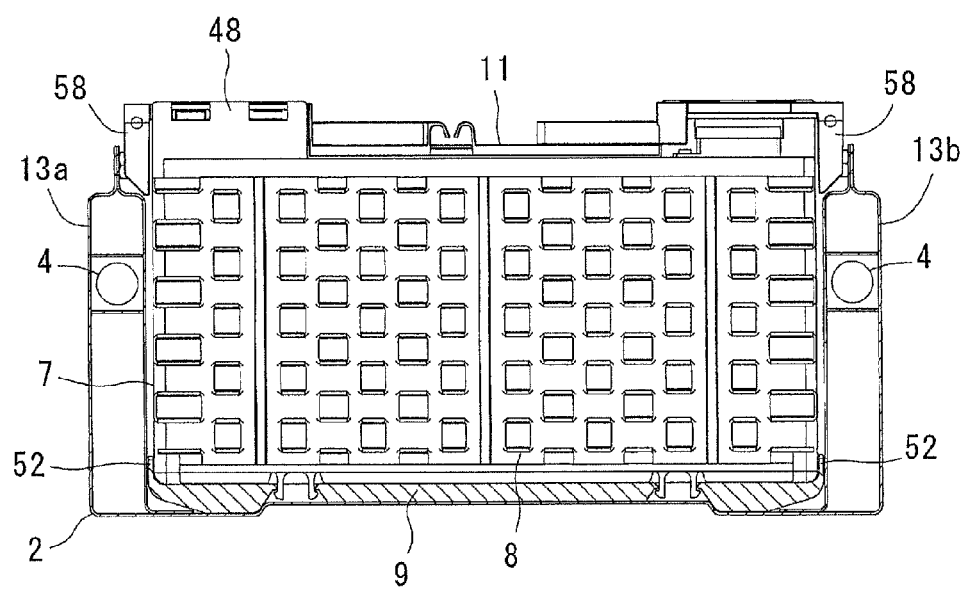
FIG. 10 is a sectional view of an assembled battery pack.

As shown in FIG. 10, since the projections 58 of the first and second inner cover members 11a and 11b are inserted between the wall portions 13a and 13b of the stack case 2 and the single cell 7, deviation of the single cell 7 in the Y direction is prevented. To prevent the deviation of the single cell 7 in the X direction, a resilient member such as a leaf spring may be interposed between the end plates 3a and 3b and the spacers 8 opposed thereto.

Figure 11:
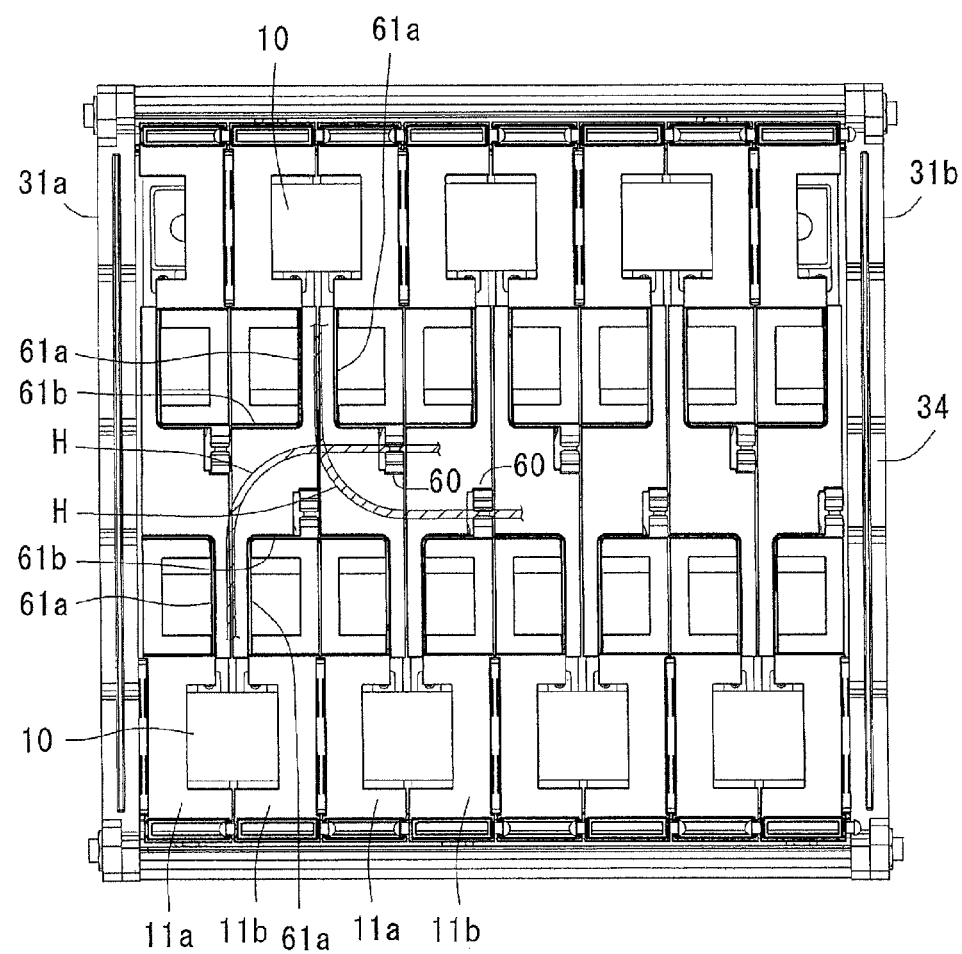
FIG. 11 is a plan view of the battery pack showing a wiring state of harnesses.

Next, as shown in FIG. 11, voltage-detecting harnesses are connected to the terminals 41 and 42 through the notch 63 of the terminal insulating portion 57 (The voltage-detecting harnesses can also be connected to the bus bar 10 through the notch 63). The harnesses are wired toward a center along a guide groove formed by the first guide portions 61a of the adjacent first and second inner cover members 11a and 11b, and the harnesses are bent 90° at the center. Further, the harnesses are wired along the guide groove formed by the adjacent second guide portions 61b, and the harnesses are pulled outside of the stack case 2 through the notches 34 of the end plates 3a and 3b while being appropriately fixed to the fixing portion 60.

After the wiring is completed, the stack outer cover 5 is placed on the upper opening of the stack case 2, the mounting pieces 38 of the stack outer cover 5 are superposed on the upper ends 17 on both ends of the stack case 2, the insertion pieces 39 of the stack outer cover 5 are inserted into the slits 33 of the end plates 3a and 3b, and mounted by being threadedly engaged with bolts. At this time, the convex portion 40 of the stack outer cover 5 is fitted into the concave portion 71 formed by steps between the base portions 56 of the first and second inner cover members 11a and 11b and the terminal insulating portions 57 on both sides thereof, and the first and second inner cover members 11a and 11b are pressed against the single cell 7.

The assembling of the battery pack 1 is completed in the above-described manner, but the assembling procedure is not limited thereto. All of the single cells 7, the spacers 8, and the bottom members 9 may be assembled outside of the stack case 2, and the assembly 6 may be accommodated in the stack case 2 at one time.

Next, an operation of the battery pack 1 will be described.

Figure 12:
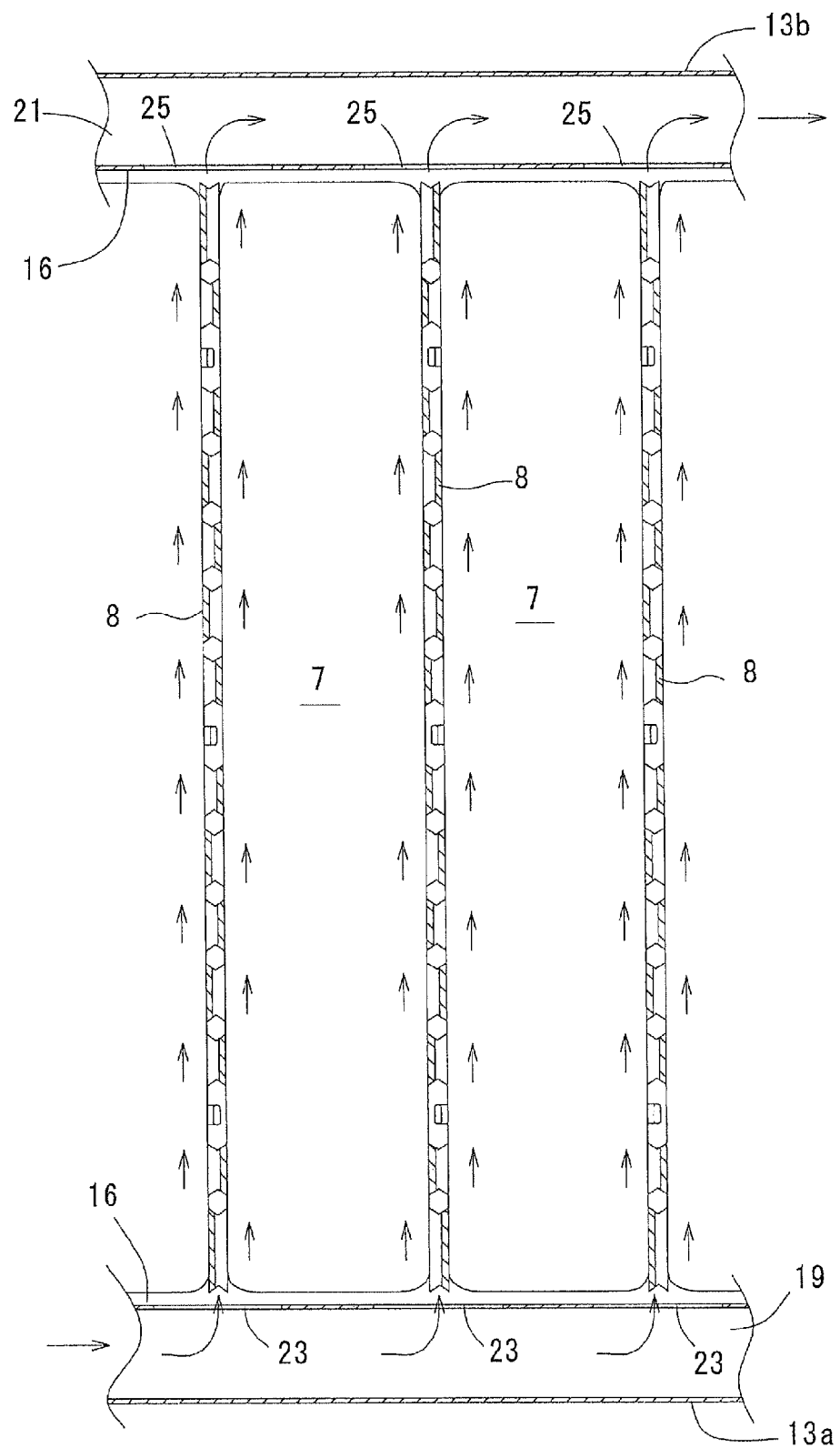
FIG. 12 is a sectional view showing a cooling flow path of the battery pack.

As shown in FIG. 12, a refrigerant introduced into the first refrigerant passage 19 and the second refrigerant passage 20 of the left wall portion 13a of the stack case 2 respectively flows from the first and second openings 23 and 24 of the inner wall 16 into the first and second convexo-concave portions 45 and 46 of the spacer 8. While the refrigerant passes through the first and second convexo-concave portions 45 and 46, the refrigerant cools the adjacent single cells 7. The refrigerant which passes through all of the first and second convexo-concave portions 45 and 46 of the spacer 8 passes through the third opening 25 and the fourth opening 26 of the right wall portion 13b of the stack case 2, and flows out into the third refrigerant passage 21 and the fourth refrigerant passage 22.

The present invention is not limited to the embodiment and can variously be modified. For example, in the embodiment, the inner cover members 11a and 11b are mounted on the spacer 8 by engaging the engaging projections 65 of the inner cover members 11a and 11b with the engaging holes 49a and 49b formed in the insulating wall 48 provided to the spacer 8. Alternatively, a spacer 8 in which engaging holes are provided to inner cover members 11a and 11b may be provided with an engaging projection. The inner cover members 11a and 11b may be mounted on portions of the spacer 8 other than the insulating wall 48. The insulating wall 48 is not necessarily integrally formed on the spacer 8. The insulating wall may be a member which is separate from the spacer 8, and such a separate insulating wall may be mounted on the spacer 8. Further, the inner cover members 11a and 11b may not be necessarily provided with notch 63 formed in the terminal insulating portion 57. Furthermore, the outer cover 5 can be omitted.

What is claimed is:

1. A battery pack comprising:
   a plurality of single cells, a first single cell of the plurality of single cells including a surface and first and second terminals formed on the surface, the second terminal having a polarity which is different from the first terminal;
   a case which accommodates the plurality of single cells arranged in line;
   a plurality of insulating members disposed on the plurality of single cells, respectively, a first insulating member of the plurality of insulating members including a first terminal insulating portion for covering the first terminal of the first single cell, from above in a direction perpendicular to the surface, and a second terminal insulating portion for covering the second terminal of the first single cell, from above in the direction perpendicular to the surface;
   a spacer disposed between the first single cell and a second single cell of the plurality of single cells which is adjacent to the first single cell; and a bus bar which electrically connects the first single cell to the second single cell, wherein the spacer includes an insulating wall disposed between terminals of the first and second single cells which are not connected with each other, and wherein the first insulating member is attached to the insulating wall.

2. The battery pack according to claim 1, wherein the insulating wall is provided with a pair of engaging holes, wherein an engaging projection is provided on the first insulating member, the engaging projection being engaged with an engaging hole of the pair of engaging holes, and wherein the plurality of insulating members comprises a second insulating member disposed on the second single cell, another engaging projection being provided on the second insulating member and being engaged with the other engaging hole of the pair of engaging holes.

3. The battery pack according to claim 2, wherein a notch is provided in the first terminal insulating portion of the first insulating member, the notch facing the bus bar.

4. The battery pack according to claim 3, wherein the first insulating member includes an engaging portion which engages with the second insulating member.

5. The battery pack according to claim 4, wherein the first insulating member includes a projection inserted between the first single cell and the case.

6. The battery pack according to claim 5, further comprising an outer cover for covering the plurality of insulating members.

7. The battery pack according to claim 6, wherein the first insulating member includes a fixing portion for fixing a harness connected to the first and second terminals of the first single cell.

8. The battery pack according to claim 1, wherein the first insulating member includes a base portion which is opposed to the surface between the first and second terminals of the first single cell and at both ends of which the first and second terminal insulating portions are provided.

9. The battery pack according to claim 1, wherein a number of the plurality of insulating members is equal to a number of the plurality of single cells.

10. The battery pack according to claim 1, wherein the first single cell of the plurality of single cells comprises a rectangular box shape.

11. The battery pack according to claim 1, wherein the plurality of insulating members comprises a first plurality of insulating members, and second plurality of insulating members which are different from the first plurality of insulating members and alternately formed with the first plurality of insulating members.

12. The battery pack according to claim 1, wherein the plurality of insulating members further comprises a second insulating member, and wherein the second insulating member comprises a third terminal insulating portion for covering a first terminal of the second single cell, and a fourth terminal insulating portion for covering a second terminal of the second single cell.

13. The battery pack according to claim 12, wherein the spacer includes an insulating wall formed between the first terminal of the first single cell and the first terminal of the second single cell, the insulating wall including first and second engaging holes, and wherein the first terminal insulating portion includes an engaging projection which engages the first engaging hole, and the third terminal insulating portion includes an engaging projection which engages the second engaging hole.

14. The battery pack according to claim 13, wherein the first terminal insulating portion includes a notch formed on a side of the first terminal insulating portion that is opposite the engaging projection, the notch being formed over a portion of the terminal on the first single cell, and wherein the third terminal insulating portion includes a notch formed on a side of the third terminal insulating portion that is opposite the engaging projection, the notch being formed over a portion of the terminal on the second single cell.

15. The battery pack according to claim 1, wherein the first insulating member further comprises:

a base portion, wherein the first terminal insulating portion is formed at a first end of the base portion and projects upward from the first end of the base portion, and the second terminal insulating portion is formed at a second end of the base portion opposite the first end, and projects upward from the second end of the base portion.

16. The battery pack according to claim 1, wherein the first terminal insulating portion comprises:

an engaging projection formed on a side of the first terminal insulating portion and projecting in a first direction; and a notch formed on a side of the first terminal insulating portion and opening in a second direction which opposite the first direction, and wherein the second terminal insulating portion comprises:

an engaging projection formed on a side of the second terminal insulating portion and projecting in the second direction; and a notch formed on a side of the second terminal insulating portion and opening in the first direction.

17. The battery pack according to claim 1, wherein the insulating wall includes a projecting portion that projects from an upper surface of the bus bar in the direction perpendicular to the surface, and wherein the first insulating member is attached to the projecting portion.

18. A battery pack comprising:

a plurality of single cells including:

a first single cell including a first surface and first and second terminals formed on the first surface, the second terminal having a polarity which is different from the first terminal; and a second single cell formed adjacent to the first single cell and including a second surface and first and second terminals formed on the second surface, the second terminal having a polarity which is different from the first terminal;

a spacer formed between the first and second single cells;

a bus bar which electrically connects the first single cell to the second single cell;

a case which accommodates the plurality of single cells arranged in line; and a plurality of insulating members disposed on the plurality of single cells, respectively, the plurality of insulating members comprising:

a first insulating member which is substantially aligned with the first single cell and has a width which is substantially the same as a width of the first single cell, and includes a first base portion formed on the first surface, a first terminal insulating portion projecting up from a first end of the first base portion and covering the first terminal of the first single cell from above in a direction perpendicular to the first surface, and a second terminal insulating portion projecting up from a second end of the first base portion which is opposite the first end, and covering the second terminal of the first single cell from above in a direction perpendicular to the first surface; and a second insulating member which is substantially aligned with the second single cell and has a width which is substantially the same as a width of the second single cell, and includes a second base portion formed on the second surface, a first terminal insulating portion projecting up from a first end of the second base portion and covering the first terminal of the second single cell from above in a direction perpendicular to the second surface, and a second terminal insulating portion projecting up from a second end of the second base portion which is opposite the first end, and covering the second terminal of the second single cell from above in a direction perpendicular to the second surface, wherein the spacer includes an insulating wall disposed between terminals of the first and second single cells which are not connected with each other, the insulating wall being formed with first and second engaging holes, and the first insulating member includes an engaging projection which engages the first engaging hole, and the second insulating member includes an engaging projection which engages the second engaging hole, and wherein the first and second engaging holes are formed in the insulating wall such that a height of the first and second engaging holes is greater than a height of the bus bar in a direction perpendicular to the first and second surfaces.

* * * * *